United States Patent
Clementi

(10) Patent No.: US 10,765,950 B1
(45) Date of Patent: Sep. 8, 2020

(54) WIRELESS ELECTRICAL CONNECTION BOX

(71) Applicant: Rich Clementi, Sidell, LA (US)

(72) Inventor: Rich Clementi, Sidell, LA (US)

( * ) Notice: Subject to any disclaimer, the term of this patent is extended or adjusted under 35 U.S.C. 154(b) by 52 days.

(21) Appl. No.: 16/267,606

(22) Filed: Feb. 5, 2019

(51) Int. Cl.
*A63F 13/73* (2014.01)
*H01R 24/30* (2011.01)
*H01R 13/66* (2006.01)
*H01R 25/00* (2006.01)

(52) U.S. Cl.
CPC .......... *A63F 13/73* (2014.09); *H01R 13/6691* (2013.01); *H01R 24/30* (2013.01); *H01R 25/006* (2013.01)

(58) Field of Classification Search
CPC ....... A63F 13/73; H01R 24/30; H01R 25/006; H01R 13/6691; H05K 5/0247; H05K 5/0208; H05K 5/0226
See application file for complete search history.

(56) References Cited

U.S. PATENT DOCUMENTS

| | | | |
|---|---|---|---|
| 5,051,837 A | 9/1991 | McJunkin | |
| 5,142,358 A | 8/1992 | Jason | |
| 5,731,763 A | 3/1998 | Herweck et al. | |
| 6,011,328 A | 1/2000 | Smith | |
| 6,529,208 B1 | 3/2003 | Chun et al. | |
| 7,154,380 B1 | 12/2006 | Tarrab, Jr. | |
| 8,523,668 B2 | 9/2013 | Rioux et al. | |
| 9,039,524 B2 | 5/2015 | Rioux et al. | |
| 2005/0164545 A1* | 7/2005 | Rosenthal | H01R 13/72 439/501 |
| 2006/0065422 A1* | 3/2006 | Broyles | H01R 13/639 174/53 |
| 2007/0063588 A1* | 3/2007 | Stoeppelwerth | B65H 75/16 307/38 |
| 2007/0074284 A1 | 3/2007 | Woog | |
| 2007/0297112 A1* | 12/2007 | Gilbert | G06F 1/266 361/91.5 |
| 2013/0003297 A1* | 1/2013 | Du-Henson | H02G 3/081 361/695 |
| 2013/0338844 A1* | 12/2013 | Chan | H01R 13/6683 700/295 |
| 2016/0006189 A1* | 1/2016 | Morehead | H01R 13/518 439/501 |

* cited by examiner

*Primary Examiner* — Rexford N Barnie
*Assistant Examiner* — Thai H Tran
(74) *Attorney, Agent, or Firm* — Cramer Patent & Design, PLLC; Aaron R. Cramer

(57) ABSTRACT

A wireless electrical connection box has a plurality of electrical receptacles secured within a translucent or transparent lock box. The lock box may by opened by use of a key or other securing means. The plurality of electrical receptacles may be actuated or deactivated wirelessly by means of a proprietary application associated with a portable electronic device.

20 Claims, 4 Drawing Sheets

WIRELESS ELECTRICAL CONNECTION BOX

FIELD OF THE INVENTION

The presently disclosed subject matter is directed to a wireless connection box.

BACKGROUND OF THE INVENTION

Daily life is filled with many distractions. While most of these distractions are needed to help keep a balance of work and play in our lives, many people, especially children, on occasions may have the tendency to allow some of these distractions to take control of their lives. Children, and even young adults, may spend an inordinate amount of time playing video games on a video game console.

However, this is often to the detriment of their school work, homework, chores, or even social interaction with their family or peers. While attempts can be made to limit such time, parents and care providers are often not physically available to perform such duties. Accordingly, there exists a need for a means by which the usage of video gaming systems as well as other types of AC operated entertainment systems can be controlled and limited remotely. The development of the Wireless Electrical Connection Box fulfills this need.

SUMMARY OF THE INVENTION

The principles of the present invention provide for a brush holder for a remotely controllable power strip which comprises a power strip body having at least four receptacles that are independently remotely controlled, a main power cord and a main power plug connected to a power source, a main power switch allowing for local deactivation of the receptacles as well as remote-control capabilities of the remotely controllable power strip, an enclosure provided on an entire upper portion of the power strip body.

The enclosure has a main box and a hinged lid. The hinged lid is attached to the main box by use of a hinge along a rear portion of the enclosure and a lockable securing mechanism on a forward face of the enclosure. The power strip also comprises a plurality of slotted openings equal in number to the receptacles provided along an upper surface of the main box. The slotted openings are equally spaced with reference to the receptacles.

The power strip also comprises up to four electrical loads each being connected to the remotely controllable power strip, up to four load power cords—each the load power cords are routed through an individual one of the slotted openings. The power strip also comprises a load power plug which is connected to an end of each the load power cord. Each load power cord is electrically connected to the receptacle. The main box may be closed upon the load power cords and secured with the lockable securing mechanism. The power strip also comprises a first wireless connection to the Internet which governs independent control of applied power to the remotely controllable power strip, while control of power application to the electrical loads remain under control of the remotely controllable power strip. One or more parameters within the Internet are governed by a second wireless connection to a computer-based controller.

The power source may be an AC wall outlet while the lockable securing mechanism may be a combination lock or a hasp with a separate padlock. The lockable securing mechanism may also be an electronic lock or a timed lock. The enclosure may be made of material selected from the group consisting of clear plastic, durable plastic, Plexiglas, opaque plastic, steel, aluminum, or Lexan.

The computer-based controller may comprise a personal computer or a tablet computer. The computer-based controller may be voice operated interface. The first wireless connection and the second wireless connection may include Wi-Fi or Bluetooth. Additionally, the first wireless connection and the second wireless connection may also include a dedicated RF control.

The remotely controllable power strip may be controlled by a responsible person who has specific controlled use of the computer-based controller to remotely control application of electrical power to any specific connected electrical loads. The computer-based controller may be governed from anywhere in the world on a recurring schedule through applications specific time periods of operation.

The load power cord passes through an individual slotted opening and within the enclosure. The load power plug may be connected to a respective receptacle. The load power plug must remain within the enclosure and is not available to be plugged into another power source and would thus remain non-operational unless power application is granted by the remotely controllable power strip. The slotted opening may allow for any size of the load power cord to pass but the load power plug would not be able to be removed therethrough. The interior space of the remotely controllable power strip may allow for a large load power plug, including large wall-mounted power supplies typically favored by electronic type electrical loads. The positioning of the slotted opening may allow for a large radius in the load power cord that would prevent damage to the load power cord yet allow for structural integrity of the main box and the hinged lid that would not be subject to compromise by physical force.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
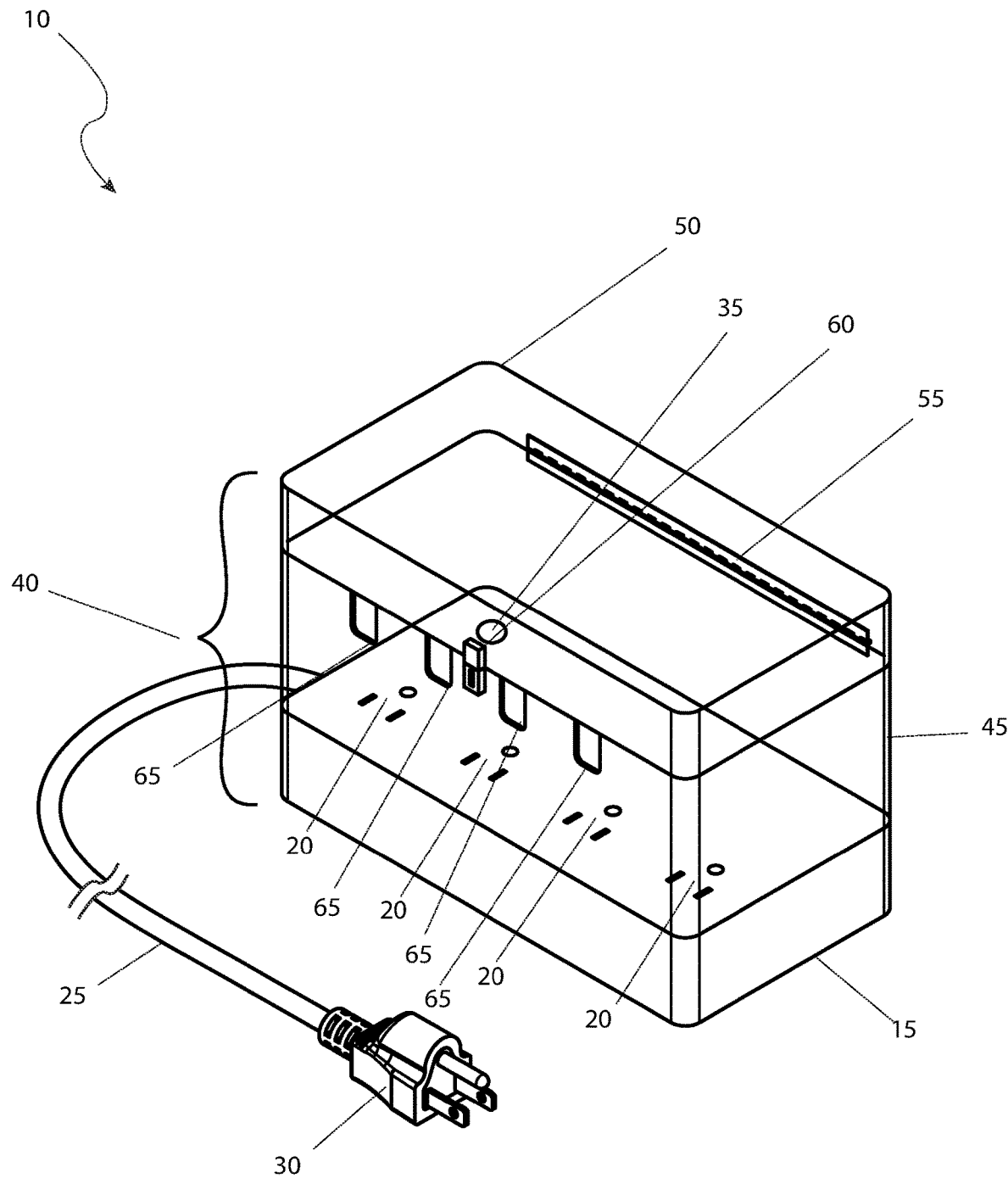
FIG. 1 is a perspective of the remotely controllable power strip 10, according to the preferred embodiment of the present invention.

DESCRIPTIVE KEY 10 remotely controllable power strip
15 power strip body
20 receptacle
25 main power cord
30 main power plug
35 main power switch
40 enclosure
45 main box 50 hinged lid
55 continuous hinge
60 lockable securing mechanism
65 slotted opening
70 power source
75 electrical load
80 load power cord
85 load power plug
90 first wireless connection
95 internet
100 second wireless connection
105 computer-based controller
110 interior space
115 large radius "r"
120 low voltage power supply
125 transmitter
130 main controller
135 relay control
140 neutral connection
145 ground connection

DESCRIPTION OF THE PREFERRED EMBODIMENTS

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Referring now to FIG. 1, a perspective view of the remotely controllable power strip 10, according to the preferred embodiment of the present invention is disclosed. The remotely controllable power strip 10 (herein also described as the "device") 10, includes a power strip body 15 with at least four (4) receptacle(s) 20 that are capable of being independently remotely controlled, as will be described in greater detail herein below.

The device 10 is provided with a main power cord 25 and a main power plug 30 as expected. It is noted that the receptacles 20 and the main power plug 30 are depicted in a NEMA 5-15R and NEMA 5-15P configuration for purposes of illustration, however other configurations and capacities used as part of electrical distribution systems around the world may be used with equal effectiveness. As such, the use of any specific configuration of the receptacles 20 and main power plug 30 is not intended to be a limiting factor of the present invention. The device 10 may be provided with a main power switch 35 to allow for local deactivation of all receptacles 20 as well the remote-control capabilities of the device 10.

An enclosure 40 is provided on the entire upper portion of the power strip body 15, having a main box 45 and a hinged lid 50. The hinged lid 50 is attached to the main box 45 by use of a continuous hinge 55 along the rear and a lockable securing mechanism 60 on the forward face. The lockable securing mechanism 60 is depicted a key lock for purposes of illustration; however, other means of locking the hinged lid 50 to the main box 45 may be utilized with equal effectiveness. Other lockable securing mechanism 60 included, but are not limited to: a combination lock, a hasp with a separate padlock, an electronic lock, or a timed lock. The specific configuration of the lockable securing mechanism 60 is not intended to be a limiting factor of the present invention. The enclosure 40 is shown as being clear in nature and made of a durable plastic material such as Plexiglas®, Lexan®, or the like. However, other materials such as opaque plastic material, steel, aluminum, or the like, may be used in an equal manner. As such, the material of construction used in the main box 45 and the hinged lid 50, is not intended to be a limiting factor of the present invention. A plurality of slotted openings 65, equal in number to the number of receptacles 20 are provided along the upper surface of the main box 45 and are equally spaced with reference to the receptacles 20. Further description on the use of the slotted openings 65 will be provided herein below.

Figure 2:
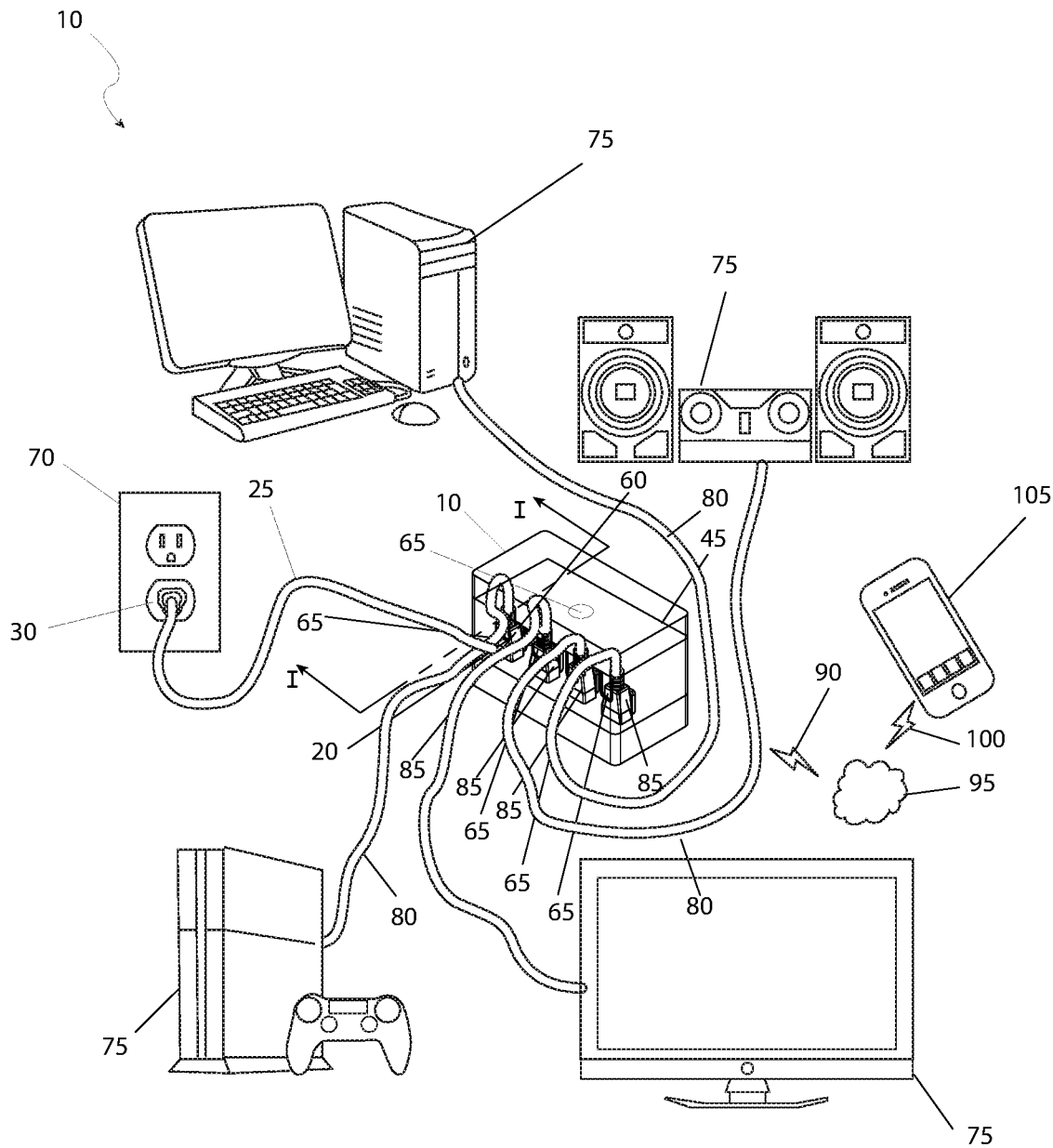
FIG. 2 is a detailed perspective view of the remotely controllable power strip 10, shown in a utilized state, according to the preferred embodiment of the present invention.

Referring next FIG. 2, a detailed perspective view of the device 10, shown in a utilized state, according to the preferred embodiment of the present invention is depicted. The main power plug 30 and the main power cord 25 are connected to a power source 70, herein depicted as an AC wall outlet. Up to four (4) electrical loads 75 are connected to the device 10 via use of up to four (4) load power cords 80. Each of the load power cords 80 are capable and configured to be routed through an individual one (1) of the slotted openings 65. A load power plug 85, connected to the end of an individual load power cord 80 is electrically connected to receptacles 20 in a typical manner. The main box 45 is then closed upon the load power cords 80 and secured with the lockable securing mechanism 60. It is envisioned that the lockable securing mechanism 60 remains under the control of a responsible person such as a parent or care provider. As such, the load power plugs 85 may not be removed and plugged into the power source 70 directly.

Control of power application to the electrical loads 75 remain under the control of the device 10. Independent control of applied power is governed via a first wireless connection 90 to the internet 95. Parameters within the internet 95 are governed by a second wireless connection 100 to a computer-based controller 105 such as a portable electronic device as indicated. However, other types of computer-based controller 105 such as a personal computer, tablet computer, voice operated interface, or the like can be used with equal effectiveness. The specific communication protocols used by the first wireless connection 90 and the second wireless connection 100 may include Wi-Fi, Bluetooth®, dedicated RF control or the like. The exact protocols used are not intended to be a limiting factor of the present invention. The electrical loads 75 may be any type of electrically operated device, however, it is envisioned that the electrical loads 75 would typically be those devices that may be linked to addictive behavior such as video gaming systems, televisions, personal computer usage, audio entertainment usage and the like as depicted by FIG. 2. It is therefore understood by those skilled in the art, that a responsible person, such as a parent or care provider, who has specific controlled use of the computer-based controller 105 may remotely control the application of electrical power to any specific connected electrical loads 75. Through applications based on the computer-based controller 105 and/or the internet 95, specific time periods of operation may be governed from anywhere in the world on a recurring schedule and/or a random event.

Figure 3:
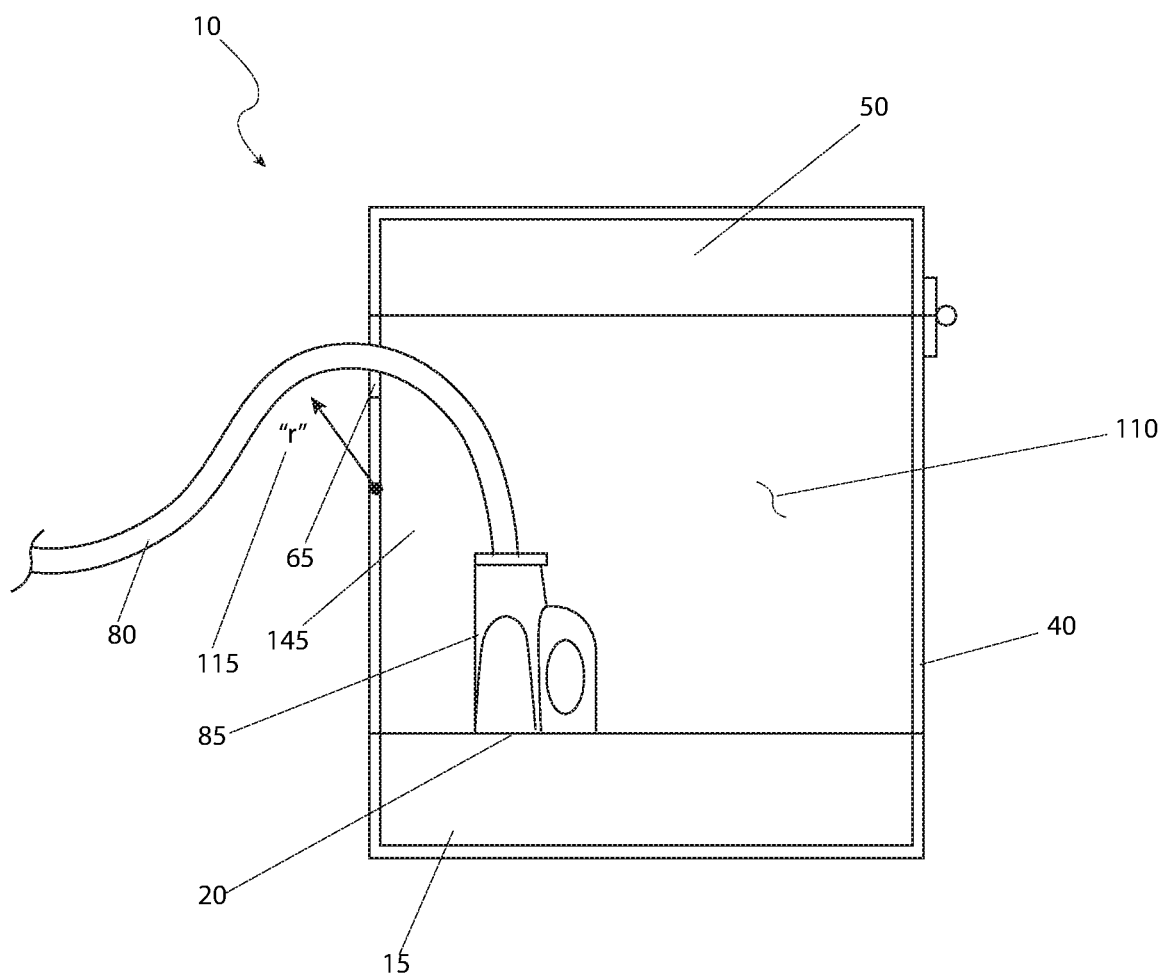
FIG. 3 is a sectional view of the remotely controllable power strip 10, as seen along a line I-I, as shown in FIG. 2, according to the preferred embodiment of the present invention; and, FIG. 4 is an electrical block diagram of the remotely controllable power strip 10, according to the preferred embodiment of the present invention.

Referring now to FIG. 3, a sectional view of the device 10, as seen along a line I-I, as shown in FIG. 2, according to the preferred embodiment of the present invention is disclosed. This view provides clarity on the routing of an individual load power cord 80 through an individual slotted opening 65 and within the enclosure 40. The load power plug 85 is then connected to the respective receptacle 20 in a customary manner. As such, the load power plug 85 must remain within the confines of the enclosure 40 and is not available to be plugged into another power source and would thus remain non-operational unless power application is granted by the device 10 as aforementioned described. The opening of the slotted opening 65 would allow for almost any size (diameter) of load power cord 80 to pass, but the load power plug 85 would not be able to be removed therethrough. The interior space 110 of the device 10 would allow for large load power plug 85, including large wall-mounted power supplies (wall-warts) typically favored by electronic type electrical loads 75 (as shown in FIG. 2). The positioning of the slotted opening 65 allows for a large radius "r" 115 in the load power cord 80 that would prevent damage to the load power cord 80 yet allow for structural integrity of the main box 45 and hinged lid 50 that would not be subject to compromise by physical force.

Figure 4:
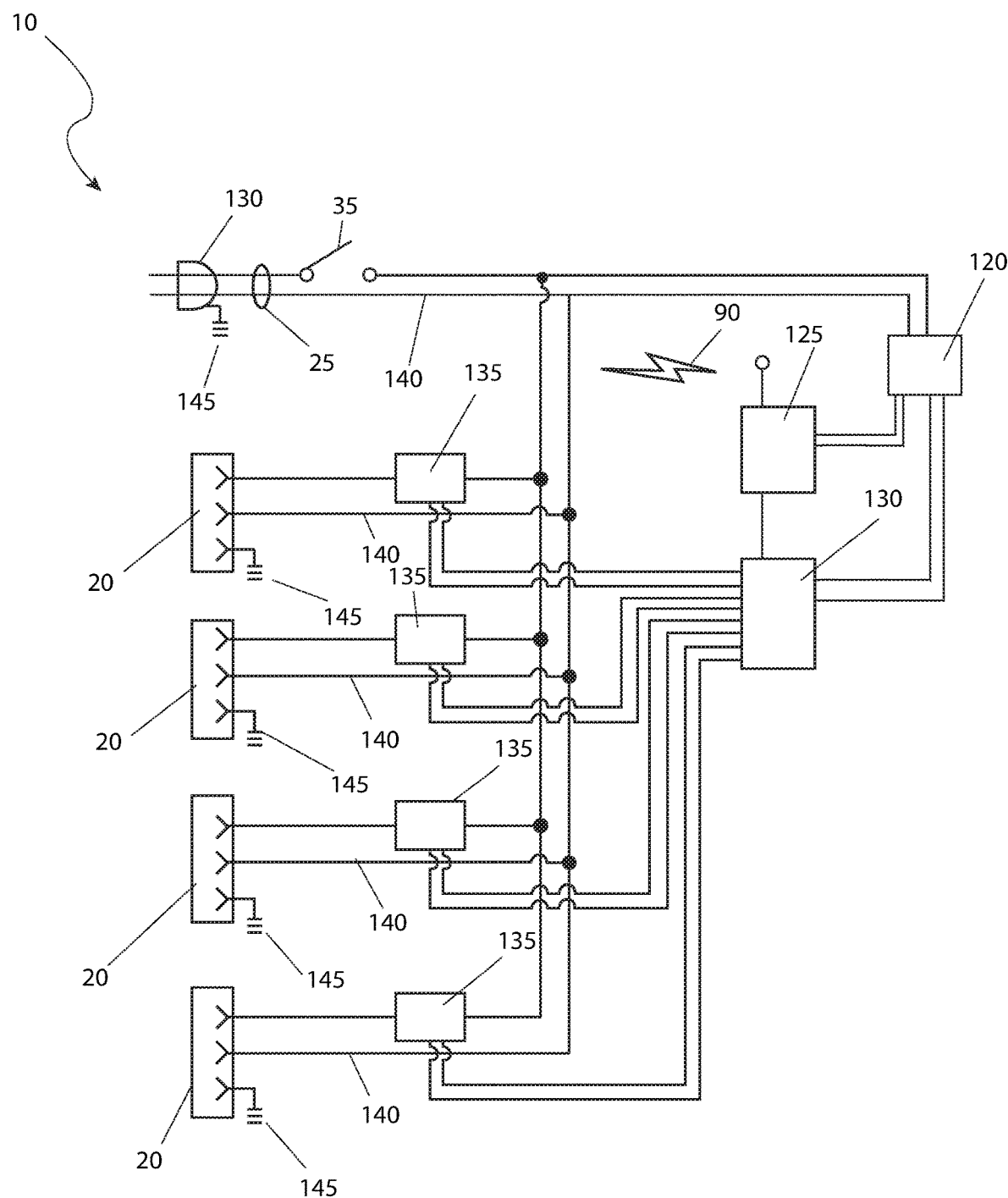

Referring finally to FIG. 4, an electrical block diagram of the device 10, according to the preferred embodiment of the present invention is depicted. Incoming power is routed through the main power plug 30 and main power cord 25 and controlled by the main power plug 30. Power is then applied to a low voltage power supply 120 that supplies power to a transmitter 125 that generates and receives the first wireless connection 90. Power is also supplied to a main controller 130 such as a single board computer (SBC). The main controller 130 then generates a set of signals that independently control at least four (4) relay controls 135 such as mechanical relays or solid-state relays, that control the application of power to the receptacles 20. Neutral connections 140 and ground connections 145 are connected in a parallel manner as shown.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 4. The user would procure the device 10 through normal procurement channels paying particular attention to specifics such electrical configuration of the main power plug 30 and receptacles 20, quantity of receptacles 20, color, style of lockable securing mechanism 60 and the like.

After procurement and prior to utilization, the device 10 would be prepared in the following manner: the main power plug 30 and main power cord 25 would be connected to a suitable power source 70; the main power switch 35 activated; the load power cords 80 connected to desired electrical loads 75 to be controlled by the device 10 would be routed through the appropriate slotted openings 65 and plugged into the respective receptacles 20; this process would be repeated up to the number of receptacles 20 provided; the hinged lid 50 would be closed and locked via the lockable securing mechanism 60; various initial setup using the computer-based controller 105 and/or the internet 95 would be performed as required with tagging of specific electrical loads 75 noted by the computer-based controller 105; and proper operation of the device 10 tested.

During utilization of the device 10, the following procedure would be initiated: at a specific time, either controlled by an internal schedule contained within the internet 95 or the computer-based controller 105, or manually initiated on the computer-based controller 105, a first wireless connection 90 would signal the transmitter 125; a resultant signal would then be passed to the computer-based controller 105 and a signal would be generated to energize the appropriate relay controls 135 and thus the respective receptacles 20; power is then applied to the desired electrical loads 75 via its load power cords 80 allowing for use. Upon completion of the necessary interval, the process is repeated to remove power and cease operation of the electrical loads 75. Usage is repeated in a cyclical manner to allow for controlled and proper use of the electrical loads 75 and prevent addictive behavior.

Usage of the device 10 is envisioned in the following situations: controlling electrical loads 75 such as televisions, gaming systems, entertainment devices and computing systems used by children. Usage could be granted upon completion of chores, homework assignments or general usage on a timed basis such as one hour (1 hr.) per evening. Usage could be controlled by parent or care provider, even if the parent or care provider is traveling at a remote location. Usage can also be controlled in institutional locations such as schools, prisons, or the like. Operation of the device 10 could also be controlled based upon electronic payment to allow operation of electrically operated appliances, tools, and devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A remotely controllable power strip, comprising:
a power strip body having at least four receptacles that are independently remotely controlled;
a main power cord and a main power plug connected to a power source;
a main power switch allowing for local deactivation of said receptacles as well as remote-control capabilities of said remotely controllable power strip;
an enclosure provided on an entire upper portion of said power strip body, said enclosure having a main box and a hinged lid, said hinged lid is attached to said main box by use of a hinge along a rear portion of said enclosure and a lockable securing mechanism on a forward face of said enclosure;
a plurality of slotted openings equal in number to said receptacles provided along an upper surface of said main box, said slotted openings are equally spaced with reference to said receptacles;

up to four electrical loads each connected to said remotely controllable power strip, up to four load power cords, each said load power cords are routed through an individual one of said slotted openings;

a load power plug connected to an end of each said load power cord, said each load power cord is electrically connected to said receptacle, said main box is closed upon said load power cords and secured with said lockable securing mechanism; and a first wireless connection to the Internet governing independent control of applied power to said remotely controllable power strip, while control of power application to said electrical loads remain under control of said remotely controllable power strip, one or more parameters within the Internet are governed by a second wireless connection to a computer-based controller.

2. The remotely controllable power strip according to claim 1, wherein said power source is an AC wall outlet.

3. The remotely controllable power strip according to claim 1, wherein said lockable securing mechanism is a combination lock.

4. The remotely controllable power strip according to claim 1, wherein said lockable securing mechanism is a hasp with a separate padlock.

5. The remotely controllable power strip according to claim 1, wherein said lockable securing mechanism is an electronic lock.

6. The remotely controllable power strip according to claim 1, wherein said lockable securing mechanism is a timed lock.

7. The remotely controllable power strip according to claim 1, wherein said enclosure is made of material selected from the group consisting of clear plastic, durable plastic, Plexiglas, opaque plastic, steel, aluminum, or Lexan.

8. The remotely controllable power strip according to claim 1, wherein said computer-based controller is a personal computer.

9. The remotely controllable power strip according to claim 1, wherein said computer-based controller is a tablet computer.

10. The remotely controllable power strip according to claim 1, wherein said computer-based controller is a voice operated interface.

11. The remotely controllable power strip according to claim 1, wherein said first wireless connection and said second wireless connection include Wi-Fi.

12. The remotely controllable power strip according to claim 1, wherein said first wireless connection and said second wireless connection include Bluetooth.

13. The remotely controllable power strip according to claim 1, wherein said first wireless connection and said second wireless connection include dedicated RF control.

14. The remotely controllable power strip according to claim 1, wherein said remotely controllable power strip is controlled by a responsible person who has specific controlled use of said computer-based controller to remotely control application of electrical power to any specific connected electrical loads.

15. The remotely controllable power strip according to claim 1, wherein said computer-based controller is governed from anywhere in the world on a recurring schedule through applications specific time periods of operation.

16. The remotely controllable power strip according to claim 1, wherein said load power cord passes through an individual slotted opening and within said enclosure, said load power plug is connected to a respective receptacle.

17. The remotely controllable power strip according to claim 1, wherein said load power plug must remain within said enclosure and is not available to be plugged into another power source and would thus remain non-operational unless power application is granted by said remotely controllable power strip.

18. The remotely controllable power strip according to claim 1, wherein said slotted opening would allow for any size of said load power cord to pass but said load power plug would not be able to be removed therethrough.

19. The remotely controllable power strip according to claim 1, wherein interior space of said remotely controllable power strip would allow for a large load power plug, including large wall-mounted power supplies typically favored by electronic type electrical loads.

20. The remotely controllable power strip according to claim 1, wherein positioning of said slotted opening allows for a large radius in said load power cord that would prevent damage to said load power cord, yet allow for structural integrity of said main box and said hinged lid that would not be subject to compromise by physical force.

\* \* \* \* \*